United States Patent
Chuang

(10) Patent No.: US 8,433,939 B2
(45) Date of Patent: Apr. 30, 2013

(54) DISPLAY APPARATUS WITH DUAL-SCREEN AND DISPLAY METHOD THEREOF

(75) Inventor: Ping-Yang Chuang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 384 days.

(21) Appl. No.: 12/953,487

(22) Filed: Nov. 24, 2010

(65) Prior Publication Data

US 2012/0030484 A1 Feb. 2, 2012

(30) Foreign Application Priority Data

Jul. 30, 2010 (TW) ................................ 99125249 A

(51) Int. Cl.
  *G06F 1/32* (2006.01)
(52) U.S. Cl.
  USPC ............ 713/323; 713/324; 715/778; 715/783
(58) Field of Classification Search .................. 713/323, 713/324; 715/778, 783
  See application file for complete search history.

(56) References Cited

U.S. PATENT DOCUMENTS

| | | | |
|---|---|---|---|
| 5,734,380 A * | 3/1998 | Adams et al. | 715/804 |
| 5,881,299 A * | 3/1999 | Nomura et al. | 713/324 |
| 7,382,333 B2 * | 6/2008 | Chen et al. | 345/1.1 |
| 8,194,091 B2 * | 6/2012 | Sugamata | 345/546 |
| 8,347,128 B2 * | 1/2013 | Suzuki et al. | 713/310 |
| 2009/0262379 A1 * | 10/2009 | Miyake et al. | 358/1.13 |

* cited by examiner

*Primary Examiner* — Thuan Du

(74) *Attorney, Agent, or Firm* — Altis Law Group, Inc.

(57) ABSTRACT

A method applied in a display apparatus is provided. The display apparatus includes a first screen, a second screen, power signal means. The first screen is volatile. The second screen is non-volatile. The power signal means generate a power off signal in response to a user operation. The method includes: determining whether a power off signal is received; displaying a user interface on the first screen if the power off signal is received; controlling the display on the second screen in response to a user selection on the operation interface; generating a shutdown signal; and powering off the first screen, and the second screen when receiving the shutdown signal.

11 Claims, 4 Drawing Sheets

DISPLAY APPARATUS WITH DUAL-SCREEN AND DISPLAY METHOD THEREOF

BACKGROUND

1. Technical Field

The present disclosure relates to display apparatuses and methods thereof and, particularly, to a display apparatus with two screens and display method thereof.

2. Description of Related Art

A conventional dual-screen electronic device includes a bigger LCD screen and a smaller LCD screen. When the electronic device is in a standby or idle state, the bigger LCD screen is powered down, and the smaller LCD screen is on to display information, for example, time. Because the smaller LCD screen is still on when the electronic device is in the standby or idle state, extra power is still unnecessarily consumed by the smaller LCD screen.

BRIEF DESCRIPTION OF THE DRAWINGS

The components of the drawings are not necessarily drawn to scale, the emphasis instead being placed upon clearly illustrating the principles of a display apparatus and a display method thereof. Moreover, in the drawings, like reference numerals designate corresponding parts throughout several views.

DETAILED DESCRIPTION

Figure 1:
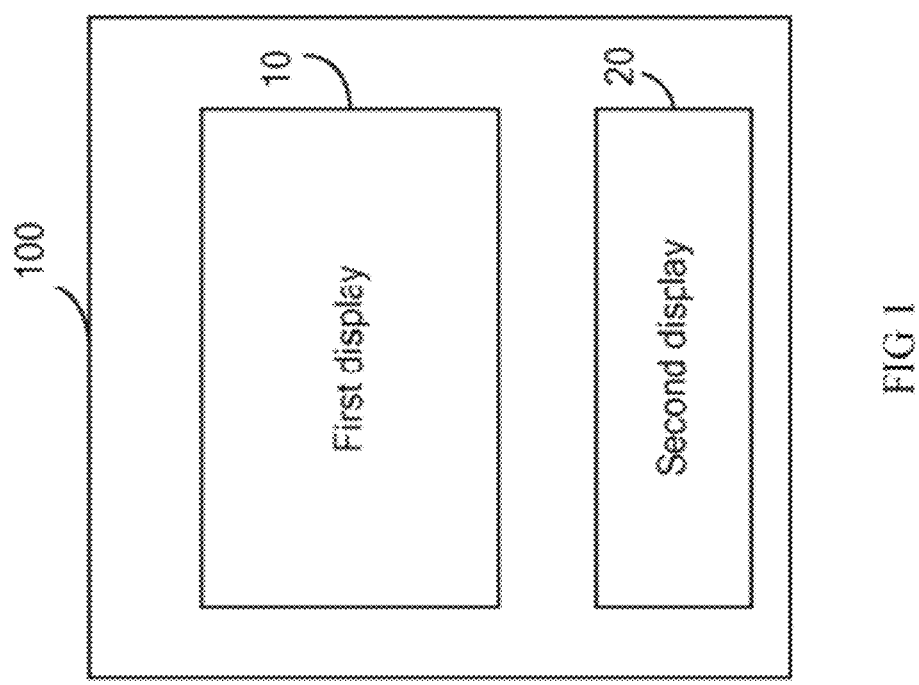
FIG. 1 is a schematic view of a display apparatus in accordance with an exemplary embodiment.
Figure 2:
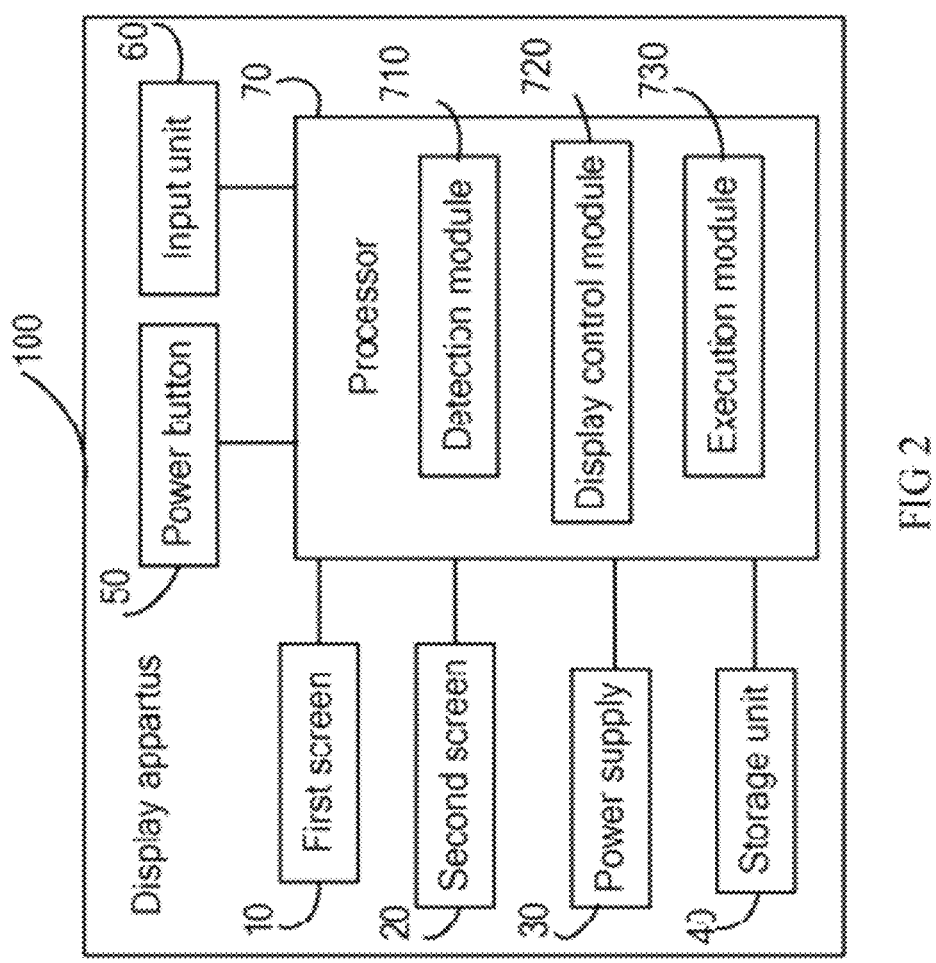
FIG. 2 is a block diagram of the display apparatus of FIG. 1 in accordance with an exemplary embodiment.

Referring to FIGS. 1-2, a display apparatus 100 includes a first screen 10, a second screen 20, a power supply 30, a storage unit 40, a power button 50, an input unit 60, and a processor 70. The first screen 10 is a volatile screen, such as a Thin Film Transistor Liquid Crystal Display (TFT LCD). The second screen 20 is a non-volatile screen, such as an Electronic Ink (E-Ink) display. In the embodiment, the first screen 10 is bigger in size than the second screen 20. The first screen 10 and the second screen 20 are separately controlled by the processor 70 to display the same or different information.

The power supply 30 provides power to display apparatus 100. The storage unit 40 stores multimedia files. In the embodiment, the multimedia files include predetermined information which can be fetched to be displayed on the second screen 20 after the display apparatus 100 is powered down. The storage unit 40 may be an internal memory or an external memory connected to the display apparatus 100 through an interface (not shown). The power button 50, as a power signal means, generates a power off signal in response to a user operation. The input unit 60 inputs information. The input unit 40 may be a keyboard or a touch pad covering the first screen 10.

The processor 70 includes a detection module 710, a display control module 720, and an execution module 730.

The detection module 710 is configured to determine whether a power off signal is received.

Figure 3:
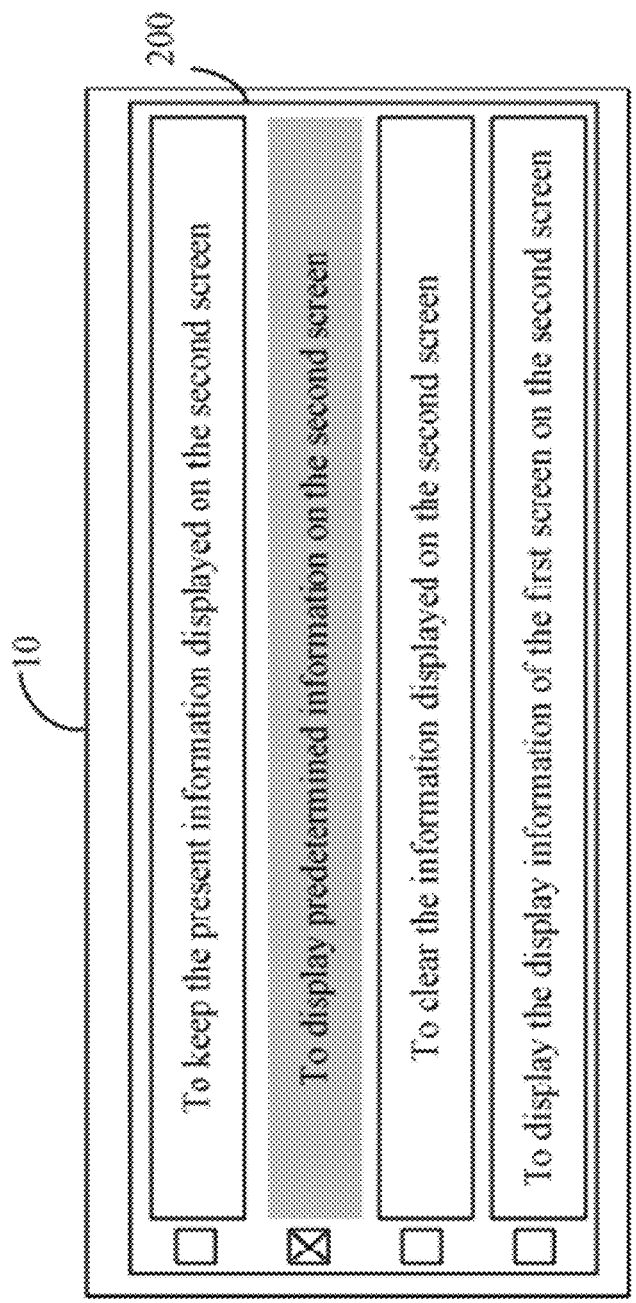
FIG. 3 is a schematic view showing a user interface displayed on the display apparatus of FIG. 1.

The display control module 720 is configured to display a user interface 200 (see FIG. 3) on the first screen 10 when the detection module 710 determines that the power off signal is received. The user interface 200 includes a first option and a second option. The first option is to display the predetermined information on the second screen 20, and the second option is to keep the present information displayed on the second screen 20 after the electronic device 100 is powered down.

If the first option is selected through the input unit 60, the display control module 720 obtains the predetermined information from the storage unit 40, and refreshes the second screen 20 to display the predetermined information. The display control module 720 is further to generate a shutdown signal for directing the execution module 730 to shut down the electronic device 100.

If the second option is selected, the display control module 720 directly generates the shutdown signal. However, users can still view the information displayed on the second screen 20 after the display apparatus 10 is powered down.

The user interface 200 may further include a third option. The third option is to clear the display information of the second screen 20 after the electronic device 100 is powered down. If the third option is selected, the display control module 720 clears the information displayed on the second screen 20 and then generates the shutdown signal. With such configuration, when the display apparatus 100 is powered down, the second screen 20 does not display any information, thus some important information displayed on the second screen 20 cannot be viewed by others.

The operation interface 200 may further include a fourth option. The fourth option is to display the display information on the first screen 10 on the second screen 20 after the display apparatus 100 is powered off. If the fourth option is selected, the display control module 720 refreshes the second screen 20 to display the information displayed on the first screen 10 when the power signal is received, and then generates the shutdown signal. With such configuration, users can still view desired information pre-displayed on the first screen 10 after the display apparatus 100 is powered off, thus power is saved.

The execution module 730 is configured to cut off the electrical connection among the power supply 30, the first screen 10, and the second screen 20 when receiving the shutdown executing signal.

Figure 4:
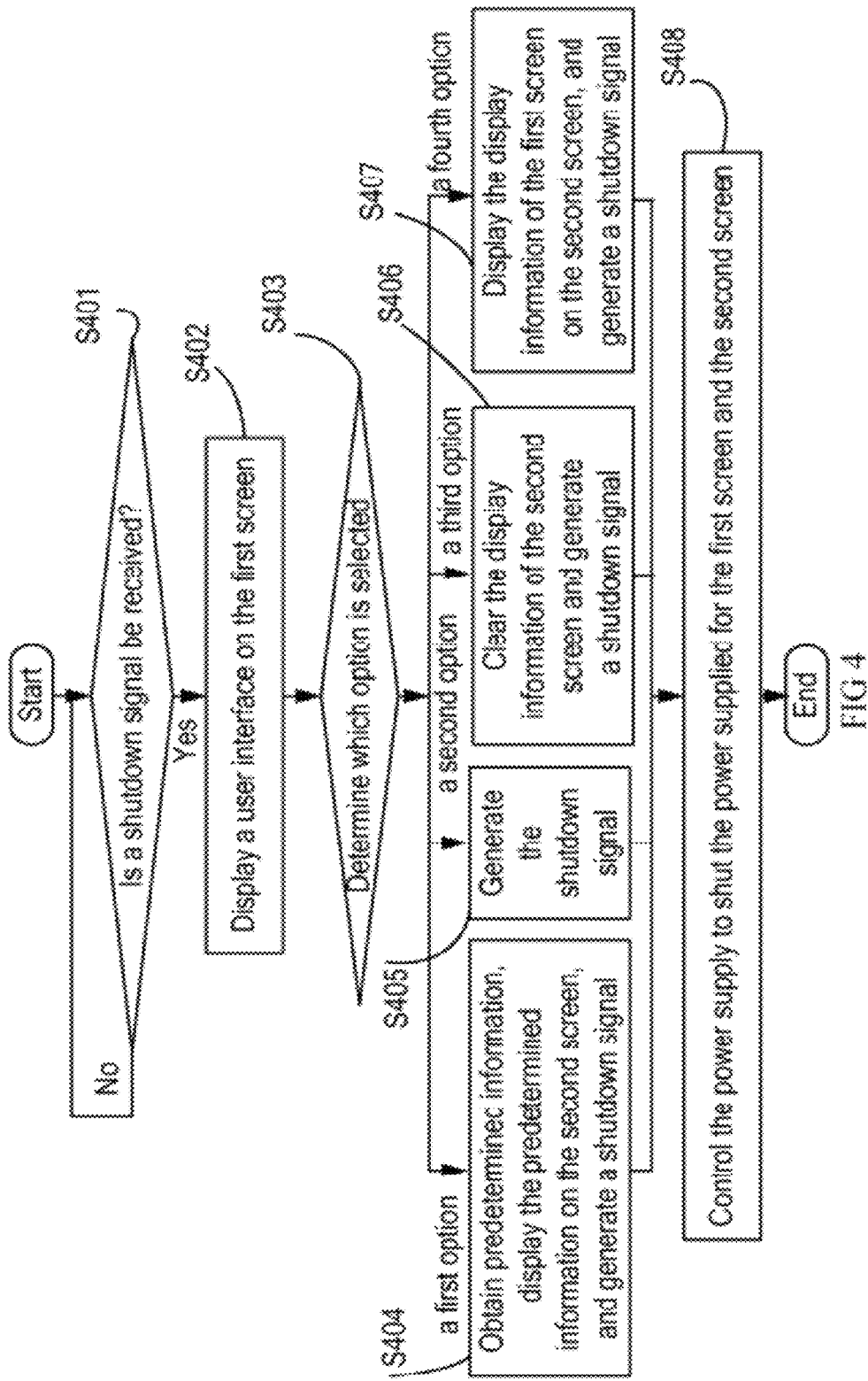
FIG. 4 is a flowchart of a display method in accordance with an exemplary embodiment.

FIG. 4 is a flowchart of a display method implemented by the display apparatus 100 in accordance with an exemplary embodiment.

In step S401, the detection module 710 determines whether the power off signal is received. If yes, the procedure goes to step S402, otherwise the procedure repeats step S401.

In step S402, the display control module 720 displays the user interface 200 on the first screen 10 for user to select.

In step S403, the display control module 720 determines which option is selected. If the first option is selected, the procedure goes to S404. If the second option is selected, the procedure goes to S405. If the third option is selected, the procedure goes to S406. If the fourth option is selected, the procedure goes to S407.

In step S404, the display control module 720 obtains the predetermined information from the storage unit 40, refreshes the second screen 20 to display predetermined information on the second screen 20, and generates a shutdown signal.

In step S405, the display control module 720 generates the shutdown signal.

In step S406, the display control module 720 clears the information displayed on the second screen 20 and generates the shutdown signal.

In step S407, the display control module 720 refreshes the second screen to display the display information of the first screen and generates the shutdown signal.

In step S408, the execution module 730 cuts off the electrical connection among the power supply, the first screen 10, and the second screen 20 when receiving the shutdown execution signal.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A display apparatus comprising:
   a first screen being a volatile display;
   a second screen being a non-volatile display;
   power signal means for generating a power off signal in response to a user operation; and
   a processor comprising:
      a detection module configured to determine whether the power off signal is received;
      a display control module configured to display a user interface on the first screen if the detection module receives the power off signal, control display on the second screen in response to a user selection on the user interface, and generate a shutdown signal; and
      an execution module configured to power off the first screen, and the second screen when receiving the shutdown signal.

2. The display apparatus as described in claim 1, wherein the first screen is bigger in size than the second screen.

3. The display apparatus as described in claim 1, further comprising an input unit, wherein the input unit is a keyboard.

4. The display apparatus as described in claim 1, further comprising an input unit, wherein the input unit is a touch pad covering the first screen.

5. The display apparatus as described in claim 1, wherein the user interface comprises a first option and a second option, the first option is to display predetermined information on the second screen, the second option is to keep the information displayed on the second screen, and wherein the display control module is to obtain the predetermined information, refreshes the second screen to display the predetermined information, and generates a shutdown signal when the first option is selected, the display control module generates a shutdown signal when the second option is selected.

6. The display apparatus as described in claim 5, wherein the user interface further comprises a third option, the third option is to clear the information displayed on the second screen, and wherein the display control module clears the information displayed on the second screen and generates a shutdown module when the third option is selected.

7. The display apparatus as described in claim 5, wherein the user interface further comprises a fourth option, the fourth option is to display the display information of the first screen on the second screen, and wherein the display control module refreshes the second screen to display the information displayed on the first screen and generates the shutdown signal when the fourth option is selected.

8. A method applied in a display apparatus, the display apparatus comprising a first screen, a second screen, power signal means, the first screen being volatile, the second screen being non-volatile, power signal means generating a power off signal in response to a user operation, the method comprising:
   determining whether a power off signal is received;
   displaying a user interface on the first screen if the power off signal is received;
   controlling display on the second screen in response to a user selection on the operation interface;
   generating a shutdown signal; and
   powering off the first screen, and the second screen when receiving the shutdown signal.

9. The method as described in claim 8, the display apparatus further comprising a storage unit, the storage unit storing predetermined information, the user interface comprising a first option and a second option, the first option being to display predetermined information on the second screen, the second option being to keep the information displayed on the second screen, wherein the step of "displaying information on the second screen in response to user selection on the user interface" comprises:
   obtaining the predetermined information from the storage unit, and refreshing the second screen to display the predetermined information when the first option is selected; and
   generating the shutdown signal directly when the second option is selected.

10. The method as described in claim 8, the user interface further comprising a third option, the third option being to clear the information displayed on the second screen, wherein the step of "displaying information in response to user selection on the user interface" further comprises:
   clearing the information displayed on the second screen when the third option is selected.

11. The method as described in claim 8, the user interface further including a fourth option, the fourth option being to display the display information of the first screen on the second screen, wherein the step of "displaying information on the second screen in response to user selection on the user interface" further comprises:
   refreshing the second screen to display the information displayed on the first screen when the fourth option is selected.

* * * * *